United States Patent

VanLaningham et al.

[11] Patent Number: 5,372,228
[45] Date of Patent: Dec. 13, 1994

[54] SOUND-DAMPING ARMATURE ASSEMBLY FOR AN ELECTROMAGNETIC COUPLING

[75] Inventors: Kalvin G. VanLaningham, Beloit, Wis.; Joel W. Hable, South Beloit, Ill.; Dwight E. Booth, Janesville, Wis.

[73] Assignee: Dana Corporation, Toledo, Ohio

[21] Appl. No.: 26,499

[22] Filed: Mar. 4, 1993

[51] Int. Cl.⁵ .............................................. F16D 27/10
[52] U.S. Cl. ............................. 192/84 C; 192/107 R; 335/271
[58] Field of Search ................. 192/84 R, 84 C, 30 V, 192/107 R, 107 C; 335/248, 271, 277

[56] References Cited

U.S. PATENT DOCUMENTS

| | | | |
|---|---|---|---|
| 3,326,343 | 6/1967 | Stuckens et al. | 192/84 C |
| 3,543,901 | 12/1970 | Longsfeld et al. | 192/30 VX |
| 3,565,223 | 2/1971 | Pierce | 192/30 VX |
| 3,620,339 | 11/1971 | Becking | 192/84 A |
| 4,493,407 | 1/1985 | Newton | 192/84 C |
| 4,557,360 | 12/1985 | Kumatani | 192/84 R |
| 5,036,964 | 8/1991 | Booth et al. | 192/84 C |
| 5,046,594 | 9/1991 | Kakinuma | 192/84 C |
| 5,150,779 | 9/1992 | Booth | 192/106.1 |

FOREIGN PATENT DOCUMENTS

| | | | |
|---|---|---|---|
| 2149419 | 4/1973 | Germany . | |
| 61-127928 | 6/1986 | Japan | 192/84 C |
| 62-17431 | 1/1987 | Japan | 192/84 C |
| 62-165031 | 7/1987 | Japan | 192/84 C |

OTHER PUBLICATIONS

Understanding Damping Techniques for Noise and Vibration Control (3 pages); Published in Plant Engineering, Apr. 28, 1983.
Tech Review TR-503 (one page); Published by EAR Division, Cabot Corporation, 1989.

*Primary Examiner*—Richard M. Lorence
*Attorney, Agent, or Firm*—Leydig, Voit & Mayer

[57] ABSTRACT

An electromagnetic clutch in which an annulus of sound damping material is sandwiched between an armature disc and a backing ring. The annulus and the backing ring coact to define a constrained-layer damping system for reducing noise when the armature disc is snapped into engagement with the rotor of the clutch and also during slipping and disengagement of the armature disc.

14 Claims, 2 Drawing Sheets

SOUND-DAMPING ARMATURE ASSEMBLY FOR AN ELECTROMAGNETIC COUPLING

BACKGROUND OF THE INVENTION

This invention relates generally to an armature assembly for a selectively engageable and disengageable coupling such as an electromagnetic clutch or brake.

Newton U.S. Pat. No. 4,493,407 discloses a typical electromagnetic clutch in which a slotted armature disc is connected to a driven hub by a mounting plate and is adapted to be attracted into engagement with a driving rotor when an electromagnet is energized. The armature disc is connected to the mounting plate by a series of leaf springs which couple the armature disc and the mounting plate for rotation in unison while allowing the armature disc to move toward and away from the rotor when the electromagnet is energized and de-energized.

Another type of armature assembly is disclosed in Booth U.S. Pat. No. 5,150,779. In that armature assembly, a resiliently yieldable plastic web acts to connect a low magnetic reluctance armature disc for rotation with the driven hub. The web flexes axially in order to permit the armature disc to move toward and away from the rotor when the clutch is engaged and disengaged.

Impact noise is produced when the armature disc is initially snapped into engagement with the rotor. Noise also is produced by vibration which occurs during slippage of the armature disc and when the disc is disengaged from the rotor.

SUMMARY OF THE INVENTION

The general aim of the present invention is to provide a new and improved armature assembly in which the level of noise produced both during initial engagement of the armature and during slippage and disengagement is reduced significantly.

A more detailed object of the invention is to achieve the foregoing by providing an armature assembly which incorporates constrained-layer damping techniques so as to increase the ability of sound damping material to effectively reduce noise.

In even a more detailed sense, the invention resides in the provision of an armature assembly in which an annulus of sound damping material is sandwiched and compressed between the armature disc and a backing ring, the latter serving as a constraining layer to cause shear strains to develop in the damping material and to cause noise to be dissipated as a result of shear deformation of the damping material.

Still another object of the invention is to rivet the various components of the armature assembly to one another to place the sound damping material in compression and, at the same time, to provide structurally strong joints between the rivets and the sound damping material.

These and other objects and advantages of the invention will become more apparent from the following detailed description when taken in conjunction with the accompanying drawings.

DETAILED DESCRIPTION OF THE PREFERRED EMBODIMENTS

Figure 1:
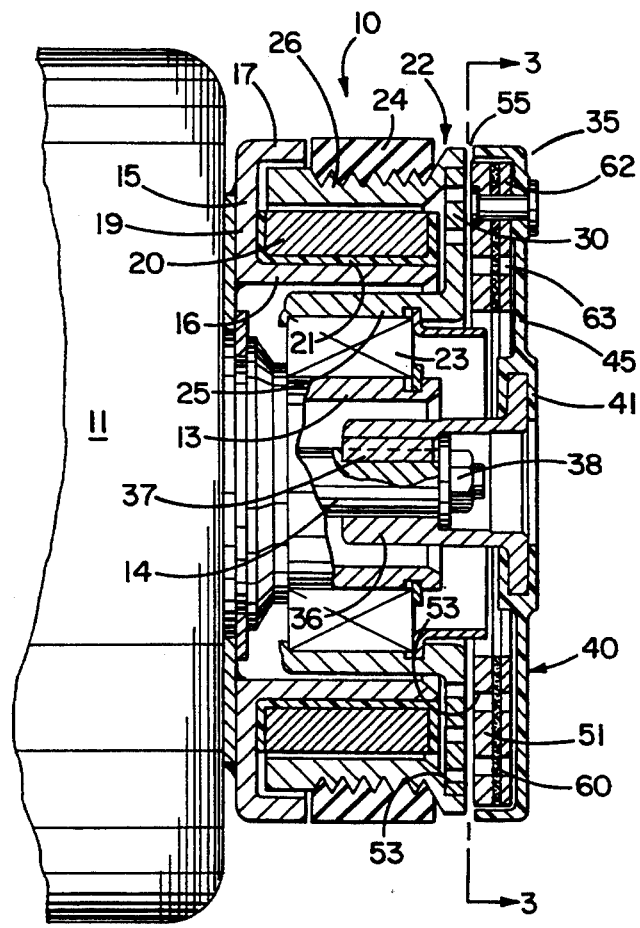
FIG. 1 is a sectional view of a typical electromagnetic coupling equipped with a new and improved armature assembly incorporating the unique features of the present invention.

For purposes of illustration, the present invention is shown in connection with an electromagnetic coupling 10 which could be a brake but which herein is in the form of an electromagnetic clutch. The clutch 10 is shown as being used in conjunction with an automobile air conditioning compressor 11 having a tubular nose 13 for mounting the clutch and having a drive shaft 14 which extends through the nose.

The clutch 10 includes an electromagnet which is formed in part by an annular magnet core 15 of substantially J-shaped radial cross-section and having an inner pole ring 16 and an outer pole ring 17. Formed integrally with and extending radially between the rear ends of the two pole rings is a bridge 19 which is rigidly secured to the end of the compressor 11. A multiple turn winding 20 is secured within a U-shaped channel 21 which, in turn, is fastened to the outer side of the inner pole ring 16. Reference may be made to Newton et al U.S. Pat. No. 4,160,498 for a more detailed disclosure of the magnet core 15.

An annular rotor 22 is rotatably journaled on the nose 13 of the compressor 11 by a bearing 23 and is adapted to be driven from the engine of the vehicle by an endless belt 24. The rotor is substantially U-shaped in radial cross-section and includes inner and outer concentric annular pole pieces 25 and 26 made of steel having low magnetic reluctance, the inner pole piece being secured to the outer race of the bearing. Several axially spaced grooves extend circumferentially around the outer side of the outer pole piece 26 and interfit with complemental ribs on the inner side of the drive belt. Accordingly, the outer pole piece defines a pulley for the belt.

The inner pole piece 25 of the rotor 22 is spaced inwardly from the inner pole ring 16 of the magnet core 15 while the outer pole piece 26 of the rotor is located between and is spaced from the winding 20 and the outer pole ring 17 of the core. When the winding 20 is excited by a voltage source, magnetic flux is produced and threads through the core and the rotor and across the various gaps between the pole rings and the pole pieces. The nature of the controlled flux transfer between the core and the rotor is explained in more detail in the aforementioned Newton et al patent.

Connected to and extending between the pole pieces 25 and 26 of the rotor 22 is an axially facing friction face 30 which is circumferentially slotted in a conventional manner so as to define multiple magnetic poles. When the winding 20 is energized, the friction face forms a rotatable magnetic field member.

Located in opposing relation to the rotor face 30 is an armature assembly 35. When the winding 20 is excited, magnetic flux draws part of the armature assembly into frictional engagement with the rotor face 30 so as to couple the armature assembly and the rotor for rotation in unison. Rotation of the armature assembly is transmitted to the shaft 14 in order to drive the compressor 11.

The armature assembly in general could be of the type disclosed in Newton U.S. Pat. No. 4,493,407. The armature assembly 35 which has specifically been shown in the drawings, however, more nearly assimilates that disclosed in Booth U.S. Pat. No. 5,150,779. Thus, the armature assembly 35 includes a tubular hub 36 which is preferably but not necessarily made of powdered metal. The hub is telescoped onto the compressor shaft 14, is keyed to the shaft at 37 and is clamped in an axially fixed position on the shaft by a nut 38 which is threaded onto the free end portion of the shaft.

The armature assembly 35 includes a spider 40 which is injection molded of resiliently yieldable material such as plastic. A suitable material for the spider is Dupont Zytel ST 8018-HS The spider 40 includes a central sleeve 41 which encircles the forward end portion of the hub 36. The hub preferably is insert molded in place when the spider is molded and thus the plastic of the sleeve is bonded to and encapsulates the outer end portion of the hub.

The spider includes a web 45 molded integrally with and extending radially from the sleeve 41. The web is preferably circular and is comparatively thin in the axial direction. Because the plastic is flexible, the web 45 is capable of flexing axially relative to the sleeve 41.

In this instance, the armature itself is formed by an annular disc 51 having a thickness of about 0.150" and made of low magnetic reluctance material such as AISI 1010 steel. The armature disc 51 is formed with two radially spaced and circumferentially extending rows of circumferentially spaced slots 53. The slots cause the armature disc 51 to have magnetic poles which coact with the poles of the face 30 of the rotor 22. When the winding 20 is de-energized, a narrow axial air gap 55 (FIG. 1) exists between the pole faces of the rotor and the pole faces of the armature disc. Upon energization of the winding, magnetic flux cuts across the gap 55 to draw the armature disc 51 into frictional engagement with the rotor and thereby couple the armature disc for rotation in unison with the rotor.

Impact noise is produced when the steel armature disc 51 is snapped into engagement with the steel rotor 22. Noise also is produced during slippage and disengagement of the armature disc. In accordance with the present invention, such noise is reduced by constructing the outer peripheral portion of the armature assembly 35 as a constrained-layer damping sandwich containing sound damping material.

Specifically, the sound damping material is in the form of an elastomeric annulus 60. The annulus preferably but not necessarily is a material sold by the E.A.R. Division of Cabot Corporation under the trade designator ISOLOSS HD-S06. The sound damping annulus 60 has a thickness of approximately 0.060".

Figure 4:
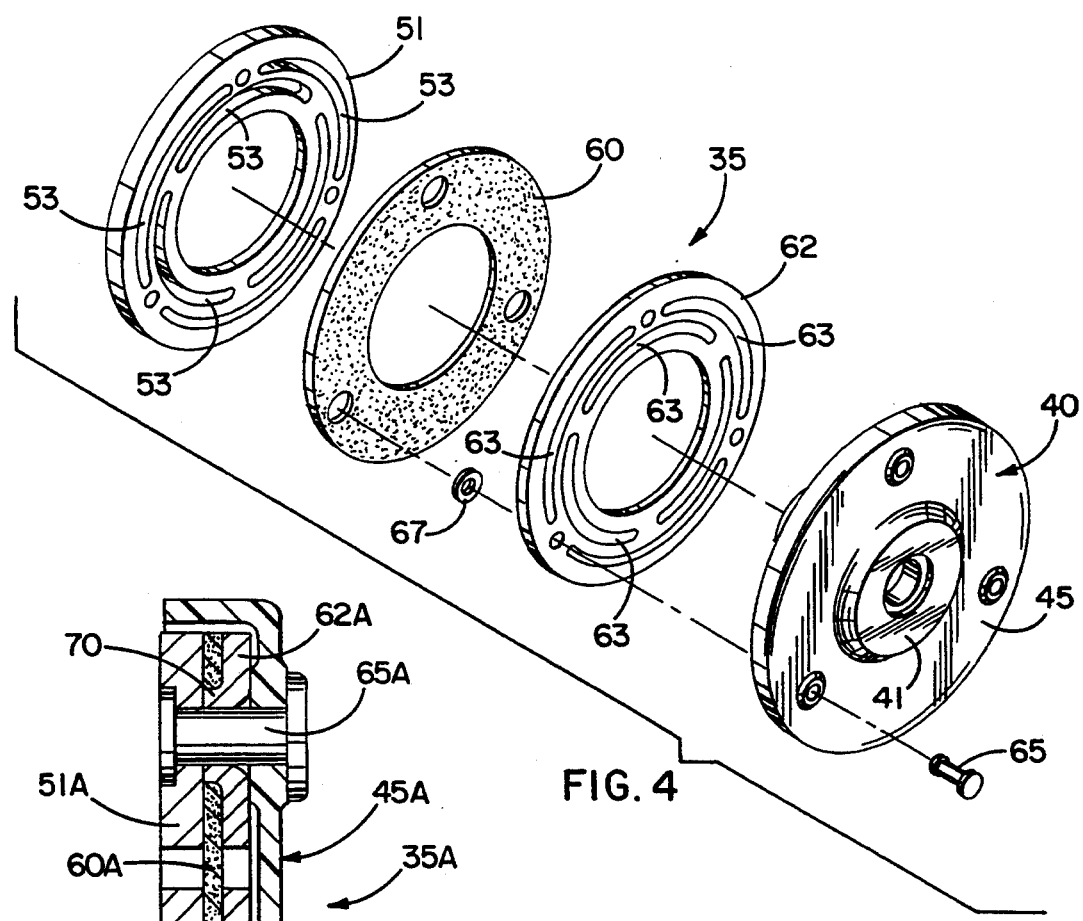
FIG. 4 is an exploded perspective view of the armature assembly.

The annulus 60 is sandwiched between the armature disc 51 and a backing ring 62 which defines a constraining layer for the sound damping material of the annulus, the backing ring being located adjacent the web 45. While the backing ring could be slotless and made of stainless steel or other material having high magnetic reluctance, it herein is made of lower cost AISI 1010 steel having a thickness of about 0.100". To restrict flux leakage through the armature assembly 35, the backing ring 62 is formed with two circumferentially extending and radially spaced rows of circumferentially extending slots 63 (FIG. 4) which are identical in size and shape to the slots 53 in the armature disc 51 and which are aligned both circumferentially and radially with the latter slots.

Figure 2:
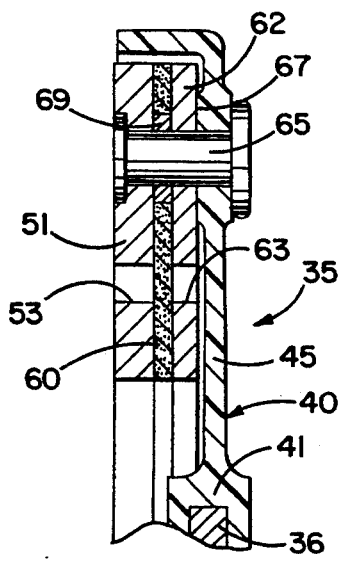
FIG. 2 is an enlarged view of a portion of the armature assembly shown in FIG. 1.
Figure 3:
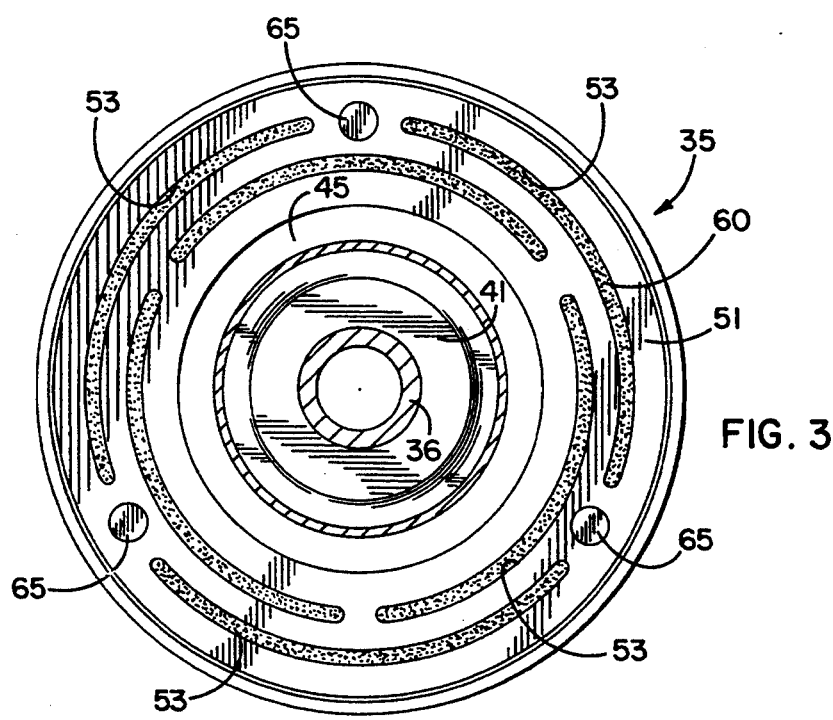
FIG. 3 is a cross-section taken along the line 3—3 of FIG. 1.

The sound damping annulus 60 is held in compression between the armature disc 51 and the constraining layer formed by the backing ring 62. In this instance, this is achieved through the use of three angularly spaced rivets 65 having shanks which extend through axially aligned holes in the web 45, the backing ring 62, the annulus 60 and the armature disc 51. The heads of the rivets are located adjacent the forward face of the web 45 while the swaged ends of the rivets are received in counterbores formed in the working face of the armature disc 51. When the rivets are swaged, the damping annulus 60 is compressed between the armature disc 51 and the backing ring 62. To prevent the backing ring 62 from engaging the web 45, angularly spaced pads 67 (FIG. 2) are molded integrally with and project rearwardly from the web adjacent the rivet holes therein and hold the backing ring in spaced relation with the web for the purposes disclosed in the aforementioned Booth patent.

Figure 5:
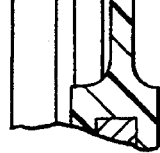
FIGS. 5, 6, 7 and 8 are views similar to FIG. 2 but show four modified embodiments of the armature assembly.

When new, the sound damping annulus 62 is soft and compliant. Upon aging and upon exposure to heat, the material may shrink and may tend to become hard. In order to keep the annulus in tight compression even though the annulus tends to shrink or harden, the joints between the annulus and the rivets 65 are strengthened by the provision of metal sleeves 69 (FIG. 2) which are located in the holes of the annulus in encircling relation with the shanks of the rivets. In the embodiment shown in FIGS. 1-4, the sleeves are simply steel washers which are sufficiently thin to allow full compression of the annulus. In an alternate embodiment of an armature assembly 35A shown in FIG. 5, sleeves are formed by extruding annular lips 70 formed integrally with and projecting axially from the backing ring 62A around the rivet holes thereof, the lips projecting rearwardly into the holes of the annulus 60A. Alternatively, forwardly extending annular lips could be extruded from the armature disc 51A.

With the foregoing arrangement, the damping annulus 60, 60A is constrained between the armature disc 51, 51A and the backing ring 62, 62A. When the armature disc is drawn into engagement with and impacts against the rotor 22, the backing ring causes shear strains to develop in the material of the damping annulus and causes energy to be dissipated by means of shear deformation of the material rather than as a result of extension and compression thereof under flexural stress as would be the case in the absence of the backing ring. It has been found that the present damping arrangement results in approximately a six dBA impact noise reduction when compared with conventional armatures of the type disclosed in Newton U.S. Pat. No. 4,493,407. Noise produced during slippage and disengagement of the armature disc also is reduced.

Figure 6:
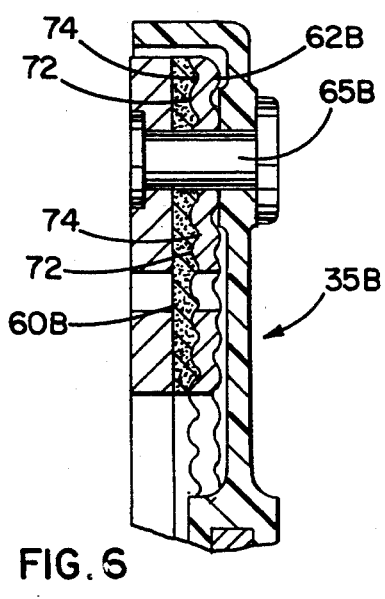

In some instances, difficulty may be encountered in economically manufacturing a thin backing ring which is flat since a thin ring tends to be flexible. Face-to-face contact between the backing ring and the damping annulus is important in order for the annulus to most effectively deform in shear. As an alternative to using a flat backing ring, a ring 62B of the type illustrated in FIG. 6 may be employed in an armature assembly which has been designated as 35B. As shown, the ring 62B is corrugated, i.e., it is formed with radially spaced rows of circumferentially extending ribs 72 and grooves 74. When the components are riveted together, the annulus 60B is compressed into compliance with the ribs and grooves to insure intimate contact between the annulus and the backing plate and also to increase the contact surface area. In the vicinity of the rivets 65B, the backing plate may be coined with flat areas in order to maintain a proper rivet joint.

Figures 7, 8:
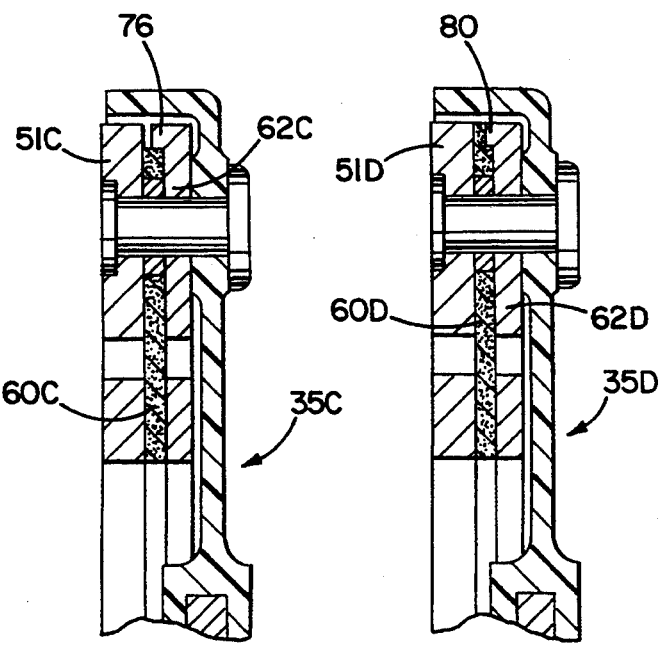

Another embodiment of an armature assembly 35C is shown in FIG. 7 in which the outer periphery of the backing plate 62C is formed with an axially projecting annular lip 76 which closely encircles the outer periphery of the damping annulus 60C, the axial length of the lip being equal to approximately 90 percent the thickness of the annulus so as to prevent the lip from interfering with compression of the annulus. The lip confines the annulus radially and prevents the annulus from extruding radially outwardly and particularly at high rotational speeds. As an alternative, the confining lip could be formed on the armature disc 51C.

In the embodiment of the armature assembly 35D shown in FIG. 8, the backing ring 62D is formed with an axially projecting annular lip 80 having an outer periphery aligned radially with the outer periphery of the damping annulus 60D and having an inner periphery spaced radially inwardly from the outer periphery of the damping annulus. Thus, the lip 80 compresses the outer peripheral portion of the annulus 60D to a greater extent than the main body of the annulus so as to prevent the annulus from extruding radially outwardly from between the armature disc 51D and the backing ring 62D at high rotational speeds. The axially facing end of the lip may be roughened or pointed to increase the bite of the lip into the annulus. Again, the lip alternatively may be formed on the armature disc or, in some cases, both the disc and the backing ring may be formed with lips. As an alternative to forming a lip on the backing ring and/or the armature disc, the outer peripheral portion of the damping annulus could be formed with an axially projecting lip which is compressed to a greater extent than the main body of the annulus.

We claim:

1. An armature assembly for a selectively engageable and disengageable electromagnetic coupling, said armature assembly comprising a generally circular armature disc made of material having low magnetic reluctance, said armature disc having at least one circumferentially extending row of circumferentially spaced slots formed therethrough, a backing ring spaced axially from said armature disc, an annulus of compressible sound damping material sandwiched between said armature disc and said backing ring, and means for securing said armature disc and said backing ring to one another while placing said annulus in constant axial compression between said disc and said ring whereby said annulus and said ring coact to define a constrained-layer damping arrangement for dampening noise produced upon engagement of said armature disc.

2. An armature assembly as defined in claim 1 in which said means comprise angularly spaced rivets each having a shank extending through said disc, said annulus and said ring.

3. An armature assembly as defined in claim 2 in which said annulus is made of elastomeric material and is formed with angularly spaced holes for receiving the shanks of said rivets, and metallic sleeves located within said holes and encircling said shanks to maintain tight joints between said shanks and said annulus.

4. An armature assembly as defined in claim 3 in which said sleeves are washers located in said holes, said washers being formed separately of said armature disc and said backing ring.

5. An armature assembly as defined in claim 3 in which said sleeves are formed integrally with and project axially from one of said backing ring and said armature disc and extend into said holes.

6. An armature assembly as defined in claim 5 in which said sleeves are formed integrally with and project axially from said backing ring.

7. An armature assembly as defined in claim 1 in which said backing ring is made of a material having high magnetic reluctance.

8. An armature assembly as defined in claim 1 in which said backing ring is made of a material having low magnetic reluctance, and at least one circumferentially extending row of circumferentially spaced slots formed through said backing ring.

9. An armature assembly as defined in claim 8 in which the slots in said backing ring are aligned circumferentially and radially with the slots in said armature disc.

10. An armature assembly as defined in claim 1 in which said ring and said annulus include mating faces, said face of said ring being formed with radially spaced rows of circumferentially extending ribs and grooves, said face of said annulus being compressed into compliance with said ribs and grooves.

11. An armature assembly as defined in claim 1 in which an annular lip is formed integrally with and projects axially from one of said backing ring and said armature disc, the inner periphery of said lip closely encircling the outer periphery of said annulus and preventing said annulus from extruding radially outwardly from between said ring and said disc.

12. An armature assembly as defined in claim 11 in which the axial length of said lip is less than the axial thickness of said annulus so as to prevent said lip from interfering with compression of said annulus.

13. An armature assembly as defined in claim 1 in which an annular lip is formed integrally with and projects axially from one of said backing ring and said armature disc, said lip having an inner periphery located radially inwardly of the outer periphery of said annulus and compressing an outer peripheral portion of said annulus to prevent said annulus from extruding radially outwardly from between said ring and said disc.

14. An armature assembly for a selectively engageable and disengageable electromagnetic coupling, said armature assembly comprising a central sleeve made of resiliently yieldable plastic, a generally circular wed formed integrally with and projecting radially from said sleeve and capable of flexing axially back and forth relative to said sleeve, a backing ring disposed in engagement with one side of said web near the outer periphery thereof, a generally circular armature disc made of a material having low magnetic reluctance and spaced axially from said backing ring, an annulus of compressible sound damping material sandwiched between said backing ring and said armature disc, and means for securing said web, said backing ring, said annulus and said armature disc to one another while placing said annulus in constant compression between said ring and said disc whereby said ring and said annulus coact to define a constrained-layer damping arrangement for dampening noise produced upon engagement of said armature disc.

* * * * *